United States Patent
Bastenhof

[11] 3,757,757
[45] Sept. 11, 1973

[54] INTERNAL-COMBUSTION ENGINE INTAKE-VALVE PROVIDED WITH A DEFLECTOR PLATE

[75] Inventor: Dirk Bastenhof, Eaubonne, France

[73] Assignee: Societe D'Etudes De Machines Thermiques, Saint-Denis, France

[22] Filed: Jan. 7, 1972

[21] Appl. No.: 216,152

[30] Foreign Application Priority Data
Jan. 28, 1971 France .............................. 7102840

[52] U.S. Cl. ...................... 123/188 VA, 123/188 R
[51] Int. Cl. .............................................. F01l 3/06
[58] Field of Search .................. 123/188 VA, 188 R

[56] References Cited
UNITED STATES PATENTS
1,956,235 4/1934 Hofferberth ................. 123/188 VA
2,868,187 1/1959 Meurer ....................... 123/188 VA
1,624,850 4/1927 Steele .......................... 123/188 VA
2,768,617 10/1956 Tierney et al. ............... 123/188 VA FOREIGN PATENTS OR APPLICATIONS
753,729 8/1933 France ........................ 123/188 VA Primary Examiner—Laurence M. Goodridge
Assistant Examiner—Dennis Toth
Attorney—Francis T. Carr et al.

[57] ABSTRACT

An intake valve for an internal-combustion engine, especially a four-stroke engine, which comprises an arcuate deflector plate located on the collar of the said valve, said deflector plate being provided with spaced apertures adjacent to said valve collar.

1 Claim, 2 Drawing Figures

PATENTED SEP 11 1973　　3,757,757
Fig. 2.
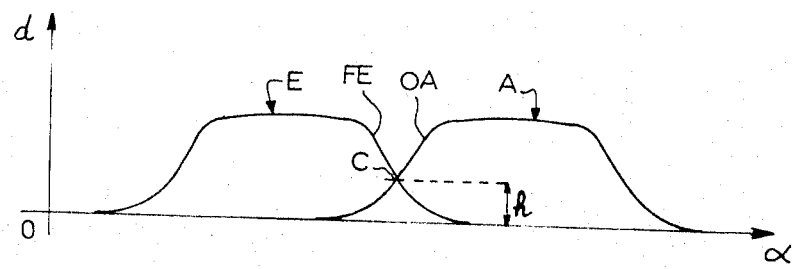
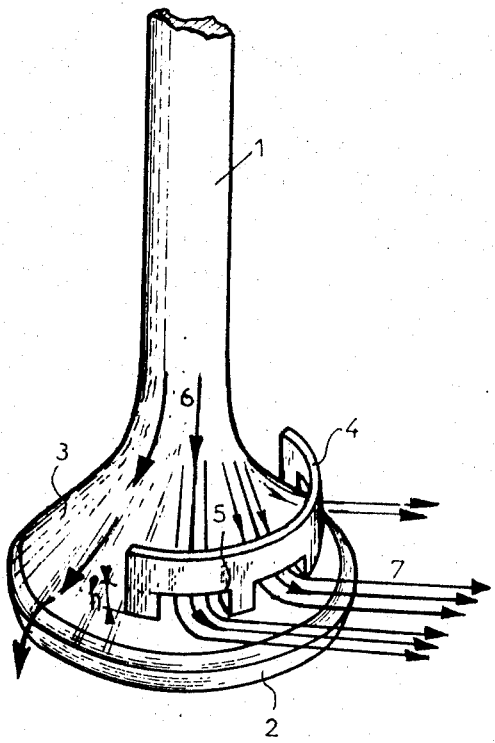
Fig. 1.

INTERNAL-COMBUSTION ENGINE INTAKE-VALVE PROVIDED WITH A DEFLECTOR PLATE

The present invention relates to and has essentially for its object an intake valve for an internal-combustion engine, especially a four-stroke-cycle engine and more particularly a Diesel engine, the said intake valve being of the mushroom-head type provided with an arcuate deflector plate located on the valve-head collar or neck.

Deflector plates are already known, which are mounted on intake valves to initiate a turbulent flow of the sucked air. It is known that, in internal-combustion engines, use is made, in order to favour the combustion process, of an intake valve provided with a screen or deflector plate to impart to the air supplied for combustion on the suction stroke a rotary motion about the longitudinal axis of the engine cylinder. The air stream is thus guided in a rotary motion which improves combustion.

However, such deflector plates or screens offer resistance to scavenging at the beginning of the intake stroke, i.e. when the intake valve begins to open while the exhaust valve is not completely closed, in case of an intercrossing or overlapping of the respective motions of exhaust valve closing and intake valve opening.

The present invention has for its purpose to remedy this drawback by providing a mushroom-head type intake-valve provided with a deflector plate resulting in practically no increase in the resistance to scavenging during the afore-mentioned critical intake-period.

To this end, the intake valve according to the present invention is provided with a deflector plate which is apertured locally at least over a portion of its length.

According to another feature of the present invention, the deflector plate is provided with several spaced apertures adjacent or in proximity to the valve collar.

According to still another feature of the invention, the said apertures are directly limited by the valve collar.

The invention will be better understood and other purposes, features and advantages of the latter will appear as the following explanatory description proceeds with reference to the appended diagrammatic drawing given solely by way of example illustrating one form of embodiment of the invention and wherein :

FIG. 1 is a perspective view of an intake-valve head provided with a deflector plate according to the invention, and FIG. 2 is a diagram illustrating the variation of the respective motions of the exhaust valve and the intake valve as a function of the angular position of the crank shaft.

Referring to FIG. 1, there is seen a mushroom-head type intake-valve having a conventional structure, i.e. comprising a stem 1, a mushroom head 2 and a taper collar 3. A substantially cylindrical arcuate vertical deflector plate 4 is mounted on the collar or neck 3, preferably in coaxial relationship to stem 1. The deflector plate 4 is apertured locally along its lower edge, so as to be provided with a series of rectangular apertures 5, one side of which is defined directly by the surface of the collar 3.

The gas stream flowing vertically along stem 1 before entering the combustion chamber of the associated engine cylinder is deflected substantially horizontally by the collar 3 at the apertured deflector plate 4. At the beginning of each intake stroke, i.e. when the valve is not yet completely open, the air can enter the combustion chamber without its flow being hindered by the deflector plate 4, since the air stream passes through the apertures 5 and is guided thereby. In FIG. 2 are illustrated the respective motions $d$ of the exhaust valve (curve E) and the intake valve (curve A) as functions of the angular position of the engine crank-shaft, starting from the completely closed position ($d=o$) of the valves. The descending portion FE of curve E, corresponding to the closing motion of the exhaust valve, and the ascending portion OA of curve A, corresponding to the opening motion of the intake valve, intercross at a point C where the respective instantaneous raised positions of both valves are equal to $d=h$. The height of each aperture 5, or its dimension is parallel relationship to the axial direction of the valve is preferably equal to the height $h$ of this common raised position (during the scavenging period) resulting from the intentional overlapping of the respective periods of exhaust-valve closing and intake-valve opening. Starting from the zero point of the rising motion of the intake valve up to the point $h$ corresponding to the height of orifices 5, the air stream reaching the region 6 is entirely guided by the apertures 5 in the direction shown by arrows 7 of the Figure. While the intake continues, i.e. when the raised position of the intake valve is higher than the said height $h$, the air stream reaching region 6 only partially passes through the apertures 5, owing to the fact that above the height $h$ the deflector plate 4 is solid and imparts to the combustion air a turbulent motion favourable to combustion.

Although the intake valve according to the invention has been described above and illustrated as being fitted with a deflector plate provided with rectangular apertures defined directly by the taper valve-collar, it is readily understood that the general principle of operation of such a valve also applies to cases where the apertures are of any shape whatsoever and located in proximity to but spaced from the collar.

From the foregoing description it appears that the intake valve according to the invention offers the advantages provided, on the one hand, by valves without a deflector plate, since such valves result in no increased resistance to scavenging at the beginning of the intake stroke, owing to the apertures, and, on the other hand, by valves provided with deflector plates of the general type, since above the apertures the deflector plate is solid and fulfills its screening function.

Of course, the invention is by no means limited to the form of embodiment described and illustrated, which has been given by way of example only. In particular, it comprises all the means constituting technical equivalents to the means described as well as their combinations, should the latter be carried out according to the spirit of the invention.

What is claimed is :

1. In an internal combustion engine, in particular a four-stroke-cycle engine, in which the respective motions of exhaust valve closing and intake valve opening intercross or overlap, an intake valve comprising a stem, a mushroom-head, a taper collar, and an arcuate deflector plate located on the collar in coaxial relationship to said stem and provided with several spaced apertures adjacent to and directly limited by said valve collar, wherein said apertures have an height or dimension in parallel relationship to the axial direction of said valve which is equal to the common height of the raised positions of, respectively, the intake valve and the exhaust valve at the moment when the height of the raised exhaust valve during its closing is equal to the height of the raised intake valve during its opening.

* * * * *